United States Patent
Kim et al.

(10) Patent No.: US 10,081,744 B2
(45) Date of Patent: Sep. 25, 2018

(54) ADHESIVE COMPOSITION HAVING IMPROVED ADHESIVE FORCE FOR USE AS INSULATOR

(71) Applicant: LG Hausys, Ltd., Seoul (KR)

(72) Inventors: Ji-Mun Kim, Seoul (KR); Eung-Kee Lee, Gunpo-si (KR); Chul-June Choi, Daejeon (KR); Myeong-Hee Kim, Anyang-si (KR); Seung-Wook Ji, Seoul (KR); Byung-Joo Jeon, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 101 days.

(21) Appl. No.: 15/103,311

(22) PCT Filed: Oct. 28, 2014

(86) PCT No.: PCT/KR2014/010195
§ 371 (c)(1),
(2) Date: Jun. 10, 2016

(87) PCT Pub. No.: WO2015/088136
PCT Pub. Date: Jun. 18, 2015

(65) Prior Publication Data
US 2016/0319167 A1 Nov. 3, 2016

(30) Foreign Application Priority Data
Dec. 13, 2013 (KR) .................. 10-2013-0155417

(51) Int. Cl.
*C09J 4/00* (2006.01)
*C09J 129/02* (2006.01)
*C09J 4/06* (2006.01)
*C08F 220/18* (2006.01)
*C08F 220/32* (2006.01)

(52) U.S. Cl.
CPC ............... *C09J 129/02* (2013.01); *C09J 4/00* (2013.01); *C09J 4/06* (2013.01); *C08F 220/18* (2013.01); *C08F 220/32* (2013.01)

(58) Field of Classification Search
USPC ......................................... 524/548, 394, 400
See application file for complete search history.

(56) References Cited

U.S. PATENT DOCUMENTS

| | | | | |
|---|---|---|---|---|
| 2010/0080943 A1* | 4/2010 | Uradnisheck | .......... | C08K 5/098 428/36.91 |
| 2010/0116432 A1* | 5/2010 | Uesugi | ..................... | C09J 7/021 156/327 |
| 2013/0202886 A1* | 8/2013 | Gerst | ..................... | C09J 133/02 428/355 AC |

* cited by examiner

*Primary Examiner* — Mark Kaucher
*Assistant Examiner* — Henry Hu
(74) *Attorney, Agent, or Firm* — Hauptman Ham, LLP

(57) ABSTRACT

Disclosed herein is an adhesive composition for an insulator, the adhesive composition including a copolymer formed by using at least one type of phenol-based monomer; at least one type of monomer that is polymerizable by an alkali salt; and at least one type of monomer that is polymerizable by a bisulfate.

9 Claims, No Drawings

ADHESIVE COMPOSITION HAVING IMPROVED ADHESIVE FORCE FOR USE AS INSULATOR

CROSS REFERENCE TO RELATED APPLICATION

This application claims the priority of Korean Patent Application No. 10-2013-0155417, filed on Dec. 13, 2013 in the KIPO (Korean Intellectual Property Office)./Further, this application is the National Phase application of International Application No. PCT/KR2014/010195 filed Oct. 28, 2014, which designates the United States and was published in Korean.

TECHNICAL FIELD

The present invention relates to an adhesive composition having improved adhesive force for use as an insulator.

BACKGROUND ART

Thermosetting foam is primarily used as an insulator of various buildings, storages, and refrigerators. Particularly, an insulator is a building material that is used to increase cooling/warming efficiency by blocking or reducing heat exchange between inside and outside of a building. In order to execute the insulator as an inside insulator or an outside insulator, an adhesive that suits the insulator is needed. In the case of the inside insulator, the insulator needs to be attached on a wall by using an adhesive, and, in long-term perspective, the insulator should not be detached from the wall for 10 years.

Also, in the case of the outside insulator, the insulator is attached on an external wall of a building by using an adhesive. Here, more emphasis is on adhesive force of the adhesive than the case when the inside insulator is used. When the insulator is separated or detached due to lack of adhesive force of the adhesive, the construction is considered as poor, and secondary or tertiary safety accidents may occur due to detachment of the wall material.

DISCLOSURE

Technical Problem

It is an aspect of the present invention to provide an adhesive composition for an insulator, wherein the adhesive composition improves compatibility with respect to thermosetting foam and maximizes adhesive force to thermosetting foam.

Technical Solution

In accordance with one aspect of the present invention, an adhesive composition for an insulator includes a copolymer that is formed of at least one type of phenol-based monomer; at least one type of monomer that is polymerizable by an alkali salt; and at least one type of monomer that is polymerizable by a bisulfate.

The phenol-based monomer may be cardanol, cardol, anacardic acid, ginkgoic acid, methylcardol, urushiol, thitsiol, rangol, laccol, phenol, alkylphenol, or alkenylphenol.

The at least one type of monomer that is polymerizable by the alkali salt may be included at an amount in a range of about 5 parts to about 40 parts by weight based on 100 parts by weight of the phenol-based monomer.

The alkali salt may be at least one selected from the group consisting of potassium carbonate, sodium carbonate, lithium carbonate, a bicarbonate salt, a bisulfide salt, a hydroxide salt, and a combination thereof.

The at least one type of monomer that is polymerizable by the bisulfite may be included at an amount in a range of about 5 parts to about 40 parts by weight based on 100 parts by weight of the phenol-based monomer.

The bisulfite may be at least one selected from the group consisting of sodium bisulfite, sodium metabisulfite, sodium hydrogen bisulfite, potassium bisulfite, potassium metabisulfite, ammonium bisulfite, succinic aldehyde disodium bisulfite, and a combination thereof.

The copolymer may be formed by further including at least one type of free radical initiator.

The free radical initiator may be at least one selected from the group consisting of an organic peroxide, an organic hydroperoxide, an azo initiator, and a combination thereof.

The free radical initiator may be at least one selected from the group consisting of benzoyl peroxide, di-t-amyl peroxide, di-cumyl peroxide, t-amyl hydroperoxide, t-butyl hydroperoxide, 2,2'-azobis(2,4-dimethylpentanenitrile), 2,2'-azobis(2-methylpropanenitrile), 2,2'-azobis(cyclohexanecarbonitrile), 2,2'-azobis(2-methylbutanenitrile), t-butylperoxy benzoate, 2,5-dimethyl-2,5di-(t-butylperoxy) hexane, 2,5-dimethyl-2,5-di-(t-butylperoxy) hexyne-3, and a combination thereof.

The polymer may be formed by further including at least one type of acryl-based monomer or at least one type of epoxy-based monomer.

The acryl-based monomer may be at least one selected from the group consisting of ethyl acrylate, butyl acrylate, ethylmethyl acrylate, propyl acrylate, 2-ethylhexyl acrylate, methyl methacrylate, ethyl methacrylate, butyl methacrylate, and a combination thereof.

The epoxy-based monomer may be at least one selected from the group consisting of glycidyl acrylate, glycidyl methacrylate, α-ethylglycidyl acrylate, α-n-propylglycidyl acrylate, α-n-butylglycidyl acrylate, β-ethylglycidyl acrylate, β-ethylglycidyl methacrylate, 3,4-epoxybutyl acrylate, 3,4-epoxybutyl methacrylate, β-ethylglycidyl methacrylate, 6,7-epoxyheptyl methacrylate, o-vinylbenzyl glycidyl ether, m-vinylbenzyl glycidyl ether, p-vinylbenzyl glycidyl ether, and a combination thereof.

Advantageous Effects

The present invention is capable of preparing an adhesive composition for an insulator, wherein the composition is used in thermosetting foam, which allows inside/outside insulation, and durability may simultaneously increase along with improvement of adhesive force.

The present invention is capable of preparing an adhesive composition for an insulator which may be used to attach thermosetting foam on a construction surface.

BEST MODE

Hereinafter, an embodiment of the present invention will be described in detail. However, the description is provided herein as an example, and thus the present invention is not limited thereto, but the present invention is only defined by the scope of claims.

According to an embodiment of the present invention, provided is an adhesive composition for an insulator, and the adhesive composition includes a copolymer that is formed of at least one type of phenol-based monomer; at least one type of monomer that is polymerizable by an alkali salt; and at least one type of monomer that is polymerizable by bisulfite.

The adhesive composition for an insulator is applied to, for example, polyurethane foam (PUF), polyisocyanurate foam (PR), or phenol foam (PF), and may be used to attach the thermosetting foam and a construction surface.

The adhesive composition for an insulator increases compatibility with respect to a thermosetting foam adhesion surface and may maximize adhesive force to thermosetting foam. Also, durability of the adhesive composition for an insulator may improve when the composition is used in inside or outside insulation compared to a conventional adhesive composition for an insulator.

The phenol-based monomer may be cardanol, cardol, anacardic acid, ginkgoic acid, methylcardol, urushiol, thitsiol, rangol, laccol, phenol, alkylphenol, or alkenylphenol.

The at least one type of monomer that is polymerizable by an alkali salt may be included at an amount in a range of 5 parts to 40 parts by weight based on 100 parts by weight of the phenol-based monomer. When the monomer is included at an amount less than about 5 parts by weight, improvement in adhesive force may be insignificant, and when the monomer is included at an amount greater than about 40 parts by weight, an amount of the unreacted alkali salt may increase, which may disturb a curing reaction of the adhesive and may deteriorate adhesive force. Therefore, when the monomer is included at the amount within this range above, adhesive force may improve, and a task of attaching the insulator and a construction surface may be easily performed.

In particular, the alkali salt may be at least one selected from the group consisting of potassium carbonate, sodium carbonate, lithium carbonate, a bicarbonate salt, a bisulfide salt, a hydroxide salt, and a combination thereof.

The at least one type of monomer that is polymerizable by bisulfite may be included at an amount in a range of 5 parts to 40 parts by weight based on 100 parts by weight of the phenol-based monomer. When the monomer is included at an amount less than about 5 parts by weight, improvement in adhesive force may be insignificant, and when the monomer is included at an amount greater than about 40 parts by weight, an amount of the unreacted alkali salt may increase, which may disturb a curing reaction of the adhesive and may deteriorate adhesive force. Therefore, when the monomer is included at the amount within this range above, adhesive force may improve, and a task of attaching the insulator and a construction surface may be easily performed.

In particular, the bisulfite may be at least one selected from the group consisting of sodium bisulfite, sodium metabisulfite, sodium hydrogen bisulfite, potassium bisulfite, potassium metabisulfite, ammonium bisulfite, succinic aldehyde disodium bisulfite, and a combination thereof.

For example, the sodium bisulfite may promote a curing reaction of the adhesive composition during an adhesion reaction between the adhesive composition for an insulator and thermosetting foam. When phenol foam is used as the thermosetting foam, the sodium bisulfite promotes a reaction of a residual phenol monomer and thus brings the residual phenol monomer to participate an adhesion reaction. In this regard, during curing of the adhesive composition, adhesive force of the adhesive composition may improve.

The copolymer may be formed by further including at least one type of free radical initiator. The at least one type of free radical initiator may be included at an amount in a range of about 0.1 wt % to about 5 wt %, or, preferably, in a range of about 0.1 wt % to about 2 wt %.

The free radical initiator may be at least one selected from the group consisting of an organic peroxide, an organic hydroperoxide, an azo initiator, and a combination thereof.

In particular, the free radical initiator may be at least one selected from the group consisting of benzoyl peroxide, di-t-amyl peroxide, di-cumyl peroxide, t-amyl hydroperoxide, t-butyl hydroperoxide, 2,2'-azobis(2,4-dimethylpentanenitrile), 2,2'-azobis(2-methylpropanenitrile), 2,2'-azobis(cyclohexanecarbonitrile), 2,2'-azobis(2-methylbutanenitrile), t-butylperoxy benzoate, 2,5-dimethyl-2,5di-(t-butylperoxy)hexane, 2,5-dimethyl-2,5-di-(t-butylperoxy) hexyne-3, and a combination thereof.

Also, the copolymer may be formed by further including at least one type of acryl-based monomer or at least one type of epoxy-based monomer to form the copolymer. The acryl-based monomer may be at least one selected from the group consisting of ethyl acrylate, butyl acrylate, ethylmethyl acrylate, propyl acrylate, 2-ethylhexyl acrylate, methyl methacrylate, ethyl methacrylate, butyl methacrylate, and a combination thereof.

Also, the epoxy-based monomer may be at least one selected from the group consisting of glycidyl acrylate, glycidyl methacrylate, α-ethylglycidyl acrylate, α-n-propylglycidyl acrylate, α-n-butylglycidyl acrylate, β-ethylglycidyl acrylate, β-ethylglycidyl methacrylate, 3,4-epoxybutyl acrylate, 3,4-epoxybutyl methacrylate, β-ethylglycidyl methacrylate, 6,7-epoxyheptyl methacrylate, o-vinylbenzyl glycidyl ether, m-vinylbenzyl glycidyl ether, p-vinylbenzyl glycidyl ether, and a combination thereof.

The copolymer may be formed by additionally including at least one type of additive selected from the group consisting of a cross-linking agent, a curing agent, a coupling agent, and a combination thereof. In addition to the additive, a UV stabilizer, an anti-oxidant, a toning agent, an adjuvant, a filler, a foaming agent, a surfactant, or a plasticizer may be appropriately included for a particular purpose of the adhesive composition for an insulator to form the copolymer included in the adhesive composition for an insulator.

Hereinafter, detailed examples of the present invention are provided. However, the examples provided herein are only for the purpose of practice or describe the present invention in detail, and thus the present invention is not limited thereto.

EXPERIMENTAL EXAMPLE—MEASUREMENT OF ADHESIVE FORCE AND ADHESIVE STRENGTH OF ADHESIVE

Example 1

An adhesive composition for an insulator including a polymer formed by polymerizing 3 kg of a phenol-based monomer, a monomer that is polymerizable by 150 g of a sodium hydroxide salt, and a monomer that is polymerizable by 300 g of sodium bisulfate was prepared.

The adhesive composition for an insulator was coated and dried at a thickness of 2 mm on an insulator EPS having a size of 70 mm×70 mm×20 mm, and adhesive force and adhesive strength of the adhesive composition were measured.

Example 2

Adhesive force and adhesive strength of the adhesive composition were measured in the same manner as in Example 1, except that PIR was used as the insulator.

Example 3

Adhesive force and adhesive strength of the adhesive composition were measured in the same manner as in Example 1, except that phenol foam was used as the insulator.

Comparative Example 1

Adhesive force and adhesive strength of the adhesive composition were measured in the same manner as in Example 1, except that commercially available epoxy bond (available from Devcon Co., U.S.) was used.

Comparative Example 2

Adhesive force and adhesive strength of the adhesive composition were measured in the same manner as in Example 2, except that commercially available styrofoam adhesive (isopink) was used.

Comparative Example 3

Adhesive force and adhesive strength of the adhesive composition were measured in the same manner as in Example 3, except that commercially available styrofoam bond (SG-2) was used.

TABLE 1

|  | Adhesive force (N) | Adhesive strength (N/m$^2$) |
|---|---|---|
| Example 1 | 159 | 4261 |
| Example 2 | 164 | 4348 |
| Example 3 | 179 | 4702 |
| Comparative Example 1 | 120 | 3540 |
| Comparative Example 2 | 142 | 3776 |
| Comparative Example 3 | 150 | 3970 |

Referring to Table 1, since measurements of adhesive force and adhesive strength of Examples 1 to 3 were greater than adhesive force and adhesive strength of Comparative Examples 1 to 3, compatibilities with respect to thermosetting foam of the adhesive compositions for an insulator of Examples 1 to 3 were better than those of the adhesive compositions for an insulator of Comparative Examples 1 to 3, and this also confirmed better adhesive force.

The invention claimed is:

1. An adhesive composition for an insulator, the adhesive composition comprising copolymers, the copolymers comprising:
    at least one phenol-based monomer;
    at least one first monomer that is polymerizable by an alkali salt, the at least one first monomer being in a range of 5 parts to 40 parts by weight based on 100 parts by weight of the phenol-based monomer;
    at least one second monomer that is polymerizable by a bisulfate, the at least one second monomer being in a range of 5 parts to 40 parts by weight based on 100 parts by weight of the phenol-based monomer; and
    at least one acryl-based monomer or at least one epoxy-based monomer.

2. The adhesive composition of claim 1, wherein the phenol-based monomer is cardanol, cardol, anacardic acid, ginkgoic acid, methylcardol, urushiol, thitsiol, rangol, laccol, phenol, alkylphenol, or alkenylphenol.

3. The adhesive composition of claim 1, wherein the alkali salt is at least one selected from the group consisting of potassium carbonate, sodium carbonate, lithium carbonate, a bicarbonate salt, a bisulfide salt, a hydroxide salt, and a combination thereof.

4. The adhesive composition of claim 1, wherein the bisulfite is at least one selected from the group consisting of sodium bisulfite, sodium metabisulfite, sodium hydrogen bisulfite, potassium bisulfite, potassium metabisulfite, ammonium bisulfite, succinic aldehyde disodium bisulfite, and a combination thereof.

5. The adhesive composition of claim 1, wherein the copolymer further comprises at least one free radical initiator.

6. The adhesive composition of claim 5, wherein the free radical initiator is at least one selected from the group consisting of an organic peroxide, an organic hydroperoxide, an azo initiator, and a combination thereof.

7. The adhesive composition of claim 5, wherein the free radical initiator is at least one selected from the group consisting of benzoyl peroxide, di-t-amyl peroxide, di-cumyl peroxide, t-amyl hydroperoxide, t-butyl hydroperoxide, 2,2'-azobis(2,4-dimethylpentanenitrile), 2,2'-azobis(2-methylpropanenitrile), 2,2'-azobis(cyclohexanecarbonitrile), 2,2'-azobis(2-methylbutanenitrile), t-butylperoxy benzoate, 2,5-dimethyl-2,5di-(t-butylperoxy)hexane, 2,5-dimethyl-2,5-di-(t-butylperoxy) hexyne-3, and a combination thereof.

8. The adhesive composition of claim 1, wherein the acryl-based monomer is at least one selected from the group consisting of ethyl acrylate, butyl acrylate, ethylmethyl acrylate, propyl acrylate, 2-ethylhexyl acrylate, methyl methacrylate, ethyl methacrylate, butyl methacrylate, and a combination thereof.

9. The adhesive composition of claim 1, wherein the epoxy-based monomer is at least one selected from the group consisting of glycidyl acrylate, glycidyl methacrylate, α-ethylglycidyl acrylate, α-n-propylglycidyl acrylate, α-n-butylglycidyl acrylate, β-ethylglycidyl acrylate, β-ethylglycidyl methacrylate, 3,4-epoxybutyl acrylate, 3,4-epoxybutyl methacrylate, β-ethylglycidyl methacrylate, 6,7-epoxyheptyl methacrylate, o-vinylbenzyl glycidyl ether, m-vinylbenzyl glycidyl ether, p-vinylbenzyl glycidyl ether, and a combination thereof.

* * * * *